United States Patent
Mondahl

(10) Patent No.: US 12,343,570 B2
(45) Date of Patent: Jul. 1, 2025

(54) DESCENT CONTROL DEVICE

(71) Applicant: Rapid Rappel Technology AS, Stjørdal (NO)

(72) Inventor: Morten Mondahl, Stjørdal (NO)

(73) Assignee: RAPID RAPPEL TECHNOLOGY AS (NO)

( * ) Notice: Subject to any disclaimer, the term of this patent is extended or adjusted under 35 U.S.C. 154(b) by 319 days.

(21) Appl. No.: 17/786,746

(22) PCT Filed: Nov. 27, 2020

(86) PCT No.: PCT/NO2020/050292
§ 371 (c)(1),
(2) Date: Jun. 17, 2022

(87) PCT Pub. No.: WO2021/125967
PCT Pub. Date: Jun. 24, 2021

(65) Prior Publication Data
US 2023/0018667 A1  Jan. 19, 2023

Related U.S. Application Data

(60) Provisional application No. 62/952,130, filed on Dec. 20, 2019.

(30) Foreign Application Priority Data

Dec. 19, 2019 (NO) .................................. 20191500

(51) Int. Cl.
*A62B 1/14* (2006.01)
*F16D 63/00* (2006.01)

(52) U.S. Cl.
CPC .............. *A62B 1/14* (2013.01); *F16D 63/008* (2013.01)

(58) Field of Classification Search
CPC ................................ A62B 1/14; F16D 63/008
(Continued)

(56) References Cited

U.S. PATENT DOCUMENTS

| 119,997 A | 10/1871 | Rice |
| 524,481 A | 8/1894 | Fowler |

(Continued)

FOREIGN PATENT DOCUMENTS

| GB | 1125774 | 8/1968 |
| JP | 2011200640 A | 10/2011 |

OTHER PUBLICATIONS

European Patent Office, International Search Report issued for International Patent Application No. PCT/NO2020/050292 on Feb. 18, 2021.

(Continued)

*Primary Examiner* — Christopher P Schwartz
(74) *Attorney, Agent, or Firm* — Duane Morris LLP

(57) ABSTRACT

The invention relates to a descent control device comprising a housing, wherein the housing comprises a rope entrance and a rope exit located at opposite sides of the housing, a channel having at least one curvature of at least 180 degrees, for accommodating the rope internally in the housing, and an element arranged in the center of the curvature, limiting the inner radius of the channel. The element is non-concentrically rotatable between a free position and a stop position, and provided with an arm protruding out through the housing for controlling the rotating between free and stop position. The channel in the curvature is narrower along substantially its whole length when the element is in stop position than in free position.

11 Claims, 4 Drawing Sheets

(58) Field of Classification Search
USPC ................ 182/5, 6, 193; 188/65.1–65.5
See application file for complete search history.

(56) References Cited

U.S. PATENT DOCUMENTS

| | | | |
|---|---|---|---|
| 4,576,248 A | 3/1986 | Marom | |
| 5,664,640 A | 9/1997 | Smith | |
| 8,225,905 B2* | 7/2012 | Delaittre | A62B 1/14 |
| | | | 182/191 |
| 11,065,477 B2* | 7/2021 | Ratalino | A62B 1/14 |
| 2003/0051944 A1 | 3/2003 | Shea | |
| 2007/0205048 A1 | 9/2007 | Klingler | |
| 2007/0215411 A1* | 9/2007 | Petzl | A62B 1/14 |
| | | | 182/5 |
| 2012/0261212 A1* | 10/2012 | Bonaiti | A62B 1/14 |
| | | | 182/5 |
| 2019/0030376 A1* | 1/2019 | Malcolm | A62B 1/14 |

OTHER PUBLICATIONS

Norwegian Grant of Patent—Patent No. 345847.
European Patent Office Communication under Rule 71(3) EPC.
Norwegian Search Report in corresponding Norwegian patent application.
Summons To Attend Oral Proceedings dated Aug. 1, 2024.

\* cited by examiner

DESCENT CONTROL DEVICE

PRIORITY CLAIM AND CROSS-REFERENCE

The present application is a National Stage Application, filed under 35 U.S.C. 371, of International Patent Application No. PCT/NO2020/050292, filed on Nov. 27, 2020, which claims the priority of Norwegian Patent Application 20191500, filed Dec. 19, 2019, and U.S. Provisional Patent Application No. 62/952,130, filed Dec. 20, 2019, each of which is incorporated herein by reference in their entirety.

TECHNICAL FIELD

The present invention relates to a descent control device according to the preamble of the independent claims.

BACKGROUND

Decent control devices are well known and used in several fields such as sports, amusement and rescue. Such devices may even be used in emergency evacuation and in military operations. A decent control device is used to control the rate of lowering a person or parcel attached to a rope, and the device is attached to the same rope.

A decent control device may be operated by the person being lowered, or by a control person/controller. The controller is normally standing on the top or ground of the height where the person or parcel is being lowered. During climbing indoor one end of the rope is normally fastened to the climber, then the rope is led through a number of fastening elements in the wall, and the other end of the rope is fastened to a controller standing on the floor, through a decent control device. If the climber falls, the controller will be able to control the rate of the lowering of the climber, or to stop the lowering completely. If the climber wants to resume the climbing before reaching the floor, it is possible for the controller to stop the lowering and resume securing the rope during the climbing.

When the climber operates the control device, a first end of the rope is secured to the surroundings, and the second end of the rope is free. The first end must be sufficiently secured to the surroundings to bear the weight of the user, including maximal weight upon a hard stop. The rope is led through the control device, and the control device is attached to the climber, whereby the climber may operate the control device to adjust the rate of the lowering.

If a decent control device is used to lower a parcel, the controller simply adjusts the rate of the rope through the controller and thereby adjusts the rate of lowering the parcel. When the parcel is lowered, the controller may even stop the lowering before the parcel reaches the ground in order to avoid any damages. The same regards lowering of unconscious persons or children which is not in a condition to operate the control device themselves.

Decent control devices may also be used in emergency and military situations, when the user simply needs to evacuate from a height such as a building or helicopter. One end of the rope is then secured at the starting point and the other end is free, either in a bag carried by the user, or let down the height. The user then controls the decent control device to adjust the rate of lowering, and/or to stop before he/she hits the ground. Then he/she frees him/herself from the rope.

The common feature for all devices is that a rope is passing through the device, and gives the user a possibility to decelerate the rate of the rope through the device, and thereby adjust the rate of the lowering.

There is however a problem if the person controlling the decent device is terrified or not alert, as the rope may run through the device at high rate and not decelerate even when the person or parcel hits the ground. A number of devices are thus developed, for instance as described in EP 0694317 and EP 3259032, to automatically stop the rope if the rate passes a given limit. The person or parcel will then be stopped during the lowering and be hanging in the rope until the device is unlocked. The stopping is hard and sudden, and the rope may be substantially weakened or even damaged depending on the weight of the person or parcel. The stop itself may even hurt the person or parcel by the straps fastening the person or parcel to the rope. This is a problem regardless of whether there is a separate control person or the person being lowered controlling the device.

From prior art one should refer to US0119997A1 relating to improvements in fire escape wherein a friction lever in the shape of a scroll is pivoted within a block to engage a rope. One should also refer to US0524481A1 relating to a fire escape.

Some known decent devices are designed in such a way that the rope is decelerated and stopped due to pressure acting on a given position of the rope. The rope may be seriously harmed during the pressure and either break in two parts immediately at the stop, or after a short time with maximum pressure, that is a short time after stop. This has fatal results as the person or parcel will fall freely to the ground.

Reference should also be made to US119997 relating to improvement in fire-escapes, where a rope passing through a block ins controlled by a head of a friction lever in the form of a scroll. One should also refer to US524481 relating to a fire escape, where a rope passes through a friction device controlled by a cam lever. Also one should refer to US20070205048 relating to an auto locking belay device using a locking carabiner. Finally one should refer to JP2011200640A which relates to a braking device for a rope for climbing.

Another problem with the known devices, is that the angle by which the rope is running into the control device, is part of the decelerate effect, and must be controlled to run in at the given angle to the device. In order to achieve this, it is normal that the user uses one hand to hold the decent control device, and the other hand to control the angle of the rope. Thereby both hands are occupied, and the user can not bring any goods, or securing a child or disabled person during the lowering at the same time as he/she is controlling the device.

There is an object of the present invention to solve the above said problems, and to provide a descent control device which should automatically decelerate the lowering rate, and stop the lowering, in case the user is not operating the device manually. Another object is that the device should decelerate and stop the lowering without causing damage to the rope.

Yet another object is that the device should be light and fit within the palm of the hand of the user, and preferably be operable with only one hand. Finally, it is an object that the device should be easy and intuitively to use and require minimum or no training of the user.

SUMMARY OF INVENTION

The objects of the present invention are achieved with a device according to the characterising part of independent claim. Further advantageous features are stated in the corresponding dependent claims.

The present invention relates to a descent control device comprising a housing, wherein the housing comprises a rope entrance and a rope exit. The housing further comprises a channel having at least one curvature of at least 180 degrees, for accommodating the rope internally in the housing, wherein an element is arranged in the centre of the curvature, limiting the inner radius of the channel through the curvature. The element is non-concentrically rotatable between a free position and a stop position, and is provided with an arm protruding out through the housing for controlling the rotation between free and stop position. The width of the channel accommodating the rope is narrower along substantially its whole length through the curvature when the element is in stop position, than it is when the element is in free position. In a preferred embodiment the curvature is more between 180 and 300 degrees, more preferred the curvature is 270 degrees.

By "curvature" it is herein meant that the channel deviates from a line, and the degree of curvature states how much a curve deviates from being a straight line. A 180 degree curvature thus means that the channel curves as a semicircle. As the channel has a width, it will have an outer radius towards the housing, and an inner radius limited by the element.

As the element is limiting the inner radius of the channel, and as the element is non-concentrically rotatable, rotation of the element will regulate the width of the channel. In the free position the width is at its widest, and in stop position, the width is at its most narrow. As the width is reduced, the friction between the rope and the housing/element is increased, and thus the positions of the element and arm between the free and stop position, will slow the rate of the rope but not stop the movement. These positions are referred to as brake positions. How much the element must rotate in order to stop the rope from running through the device, depends on the forces acting on the rope, i.e. the weight of the person or parcel being lowered during normal use. If a larger weight is being lowered, the element will rotate further before the rope stops, than if a lighter weight is being lowered. The stop position is thus relative to the weight being lowered.

The user, using the device, may regulate the position of the arm of the element, and thus regulate the position of the element and thereby the rate of the rope through the housing. When the element is in free position, the arm should be aligned with the housing, and when the element is in stop position the arm should be protruding from the housing, more preferably protruding from the curvature.

When the rope is moving through the device, it will naturally move away from the outer radius of the curvature and towards the inner radius being the element, as the rope is trying to straighten out. This is regardless of the width of the channel and regardless of the direction of the rope, and obvious to any skilled person. The rope will thus engage the element and sufficient friction between the element and the rope to rotate the element towards stop position when the rope is running through the channel, will occur. Therefore, if the user does not prevent the arm from moving, the element will move into stop position and the lowering will stop automatically.

In a preferred embodiment, the peripheral edge of the element is curved closely corresponding the curvature of the channel in the housing, and the remaining peripheral edge of the element has a reduced curve compared to the curvature. In an alternative embodiment, the remaining peripheral edge of the element is flat, meaning that there is no curvature only a flat surface. If the curvature is 180 degrees circular, then the element may be shaped as a half circle, having 180 degrees shaped as a circle, and the remaining part, also being 180 degrees, is flat. If the curvature is 270 degrees, then the shape of the element may be as a 270 degree circle having a flat side along the remaining periphery.

Further, in a preferred embodiment, the remaining peripheral edge of the element, being flat or less curved than the curvature, constitutes at least parts of the inner radius of the channel in the curvature of the housing when the element is in free position. The remaining peripheral edge of the element is rotated out of the curvature when the element is in stop position.

In an alternative embodiment, the transition between the remaining peripheral edge and peripheral edge being curved as the curvature, in the rotating-direction towards stop position, may be designed protruding as a nose, whereby the nose will enter the beginning of the curvature when the element is in stop position. As the nose is protruding, it will limit the width of the channel in the curvature even further, and exert extra pressure to the rope. As the width of the channel is narrowed along the whole channel by rotating the element before the nose enters the curvature, the forces acting on the rope will be distributed along the whole curvature and wear and possible break of the rope is thus avoided compared to prior art.

In a preferred embodiment, the peripheral edge of the element being curved corresponding the curvature, has protrusions and/or recesses to increase the friction when the rope is running through the device. The protrusions and/or recesses are preferably perpendicular to the channel in order to increase the friction even more. To further increase the friction, and to avoid that the acceleration and retardation are sudden, the housing also has protrusions and/or recesses in a side constituting the outer radius of the curvature. In a preferred embodiment, the protrusions and/or recesses in the housing is arranged about 20-45, preferably 30 degrees into the curvature.

When the element is in free position, the arm should be aligned with the housing, and when the element is in stop position the arm should be protruding from the housing.

In an alternative embodiment, the housing further comprises limitation means arranged on the outside of the housing, limiting the minimum distance between the arm and the housing. By preventing the arm to align with the housing, the element will not be able to move into totally free position, and thus the maximum rate of the rope through the device will be limited.

The limitation means are preferably comprising a spring loaded stopper, projecting along the side of the housing from a protruding part of the housing towards the arm protruding out of the housing, in such a way that the arm will abut against the stopper upon rotation of the element, and be prevented from getting closer to the housing. The stopper should be spring loaded to be able to redraw it to a retracted position, preferably into the protruding part, thereby allowing the element to rotate into free position, in case maximum rate is necessary in a specific situation.

In a further alternative embodiment, the housing of the device further comprises a rotatably asymmetric member, or a member arranged non-concentrically rotatably, close to the wall of the housing, between the inlet and outlet of the rope, preferably between the inlet and the above described curvature. This member creates a second channel to accommodate the rope in the housing, whereby the channel has different width depending on the rotation of the member.

The rope entrance and rope exit of the device are preferably located at opposite sides of the housing, in such a way that the rope direction upon entrance and the rope direction upon exit will be parallel. This will make the lowering easier as the rope may be hanging freely both above and below the decent control device, and the device does not need to be held at an angle during use.

The rope should have a rigidness preventing it from getting tangled or forming knots when coiled, and when passed through the descent control device. A preferred rope is a braided rope, such as a 12 strands braided rope, another possible rope has a nylon core with a woven outer protective layer, and may be manufactured in Aramid®, Kevlar® or similar type of material.

The descent controller may be a part of a rescue equipment or clothing, and in such case the rope should be packaged or coiled in such a way that it can be passed rapidly through the descent control device. The packaged or coiled rope may be stored in a suitable pocket for instance in a jacket or in a bag.

The shown descent control device may be premanufactured in one part wherein the rope is inserted during manufacturing, or in two parts having a main housing and a cover (not shown). The cover may be secured to the main body by using screws, nails, bolts, welding or gluing or similar which will be obvious to a skilled person. The main body and possible cover may be manufactured in metal like aluminium, titanium, steel or similar, or a suitable composite or plastic where sections of the housing may be reinforced with heat resistant materials like steel, titanium, aluminium, and ceramics or similar.

The housing prevents that dirt, debris or other objects may enter the descent control device and interfere with the rotation of the element. The housing may also function for conducting and dissipating heat generated inside the descent control device.

The material of the element and preferably the manipulation arm, needs to withstand and dissipate any heat created by the friction, and should be manufactured in a metal like aluminium or titanium. Other materials may be plastics, reinforced plastics, ceramics or other material that are sufficiently strong to fulfil the purpose of the intended use. The manipulation arm may be covered in a material limiting heat transfer from manipulation arm to a users hand. This material may also provide a surface of the manipulation arm that is more pleasant to hold during use. In the shown embodiment, the manipulation arm is covered in plastic, preferably shaped ergonomically for the hand palm of a user.

Even when the element is in the free position, it engages the rope and the friction is sufficient to rotate the element towards the stop position regardless of the rate of the rope. The rope will not pass through the descent control device unless the user manually holds the manipulation arm in the free position.

Example

The invention will now be described with the help of the enclosed figures, showing a descent control device according to the present invention. The different parts of the figure are not necessarily in scale to each other, as the figure is merely for illustrating the invention.

The following description of an exemplary embodiment refers to the figures, and the following detailed description is not meant or intended to limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

DESCRIPTION OF FIGURES

A preferred embodiment of the invention will now be described, by way of example, with reference to the following figures.

DESCRIPTION OF EMBODIMENTS OF THE INVENTION

Figure 1:
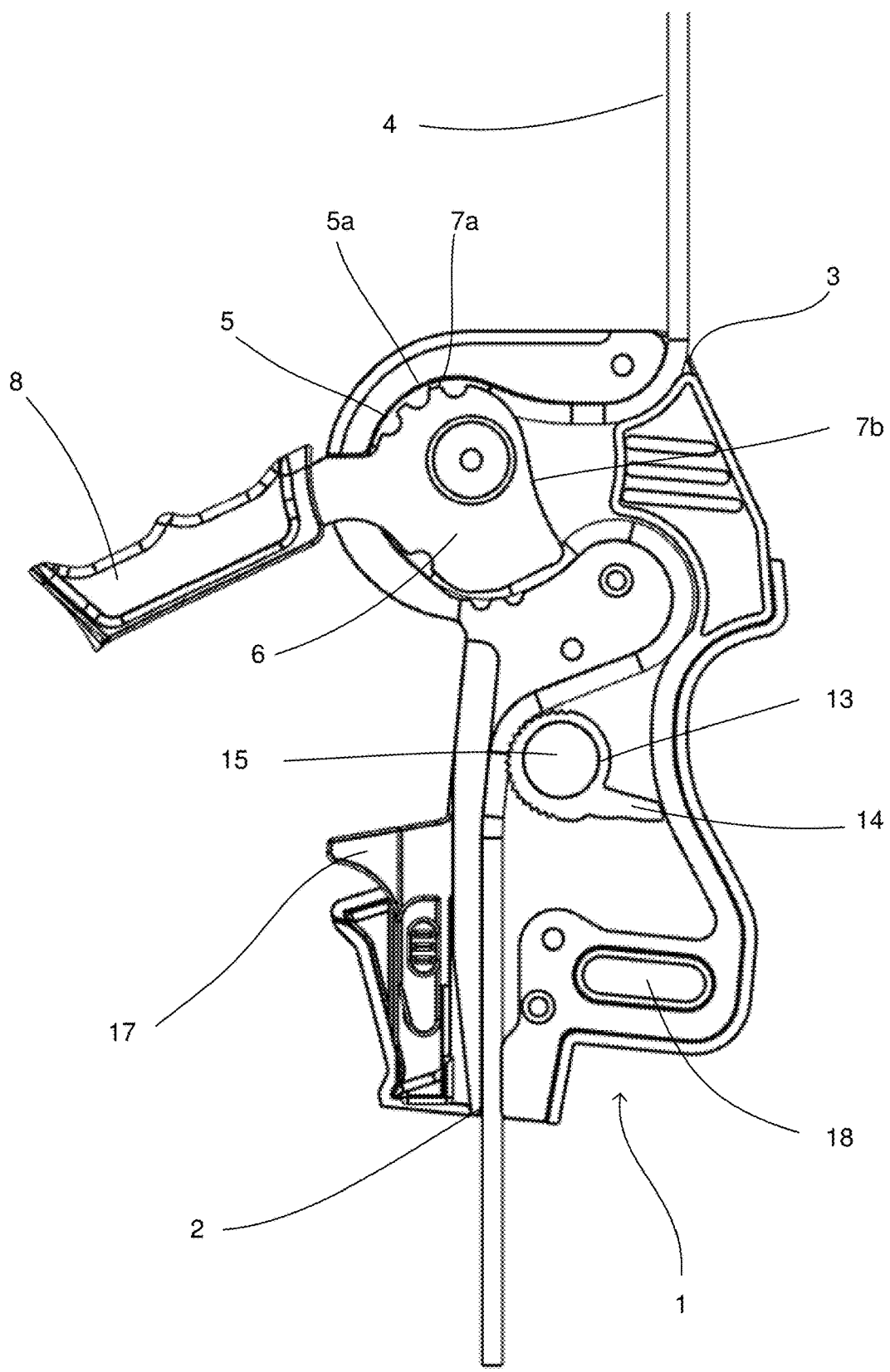
FIG. 1 shows a descent control device according to the invention, wherein a lid is removed and a non-concentric element is in a stop position.
Figure 2:
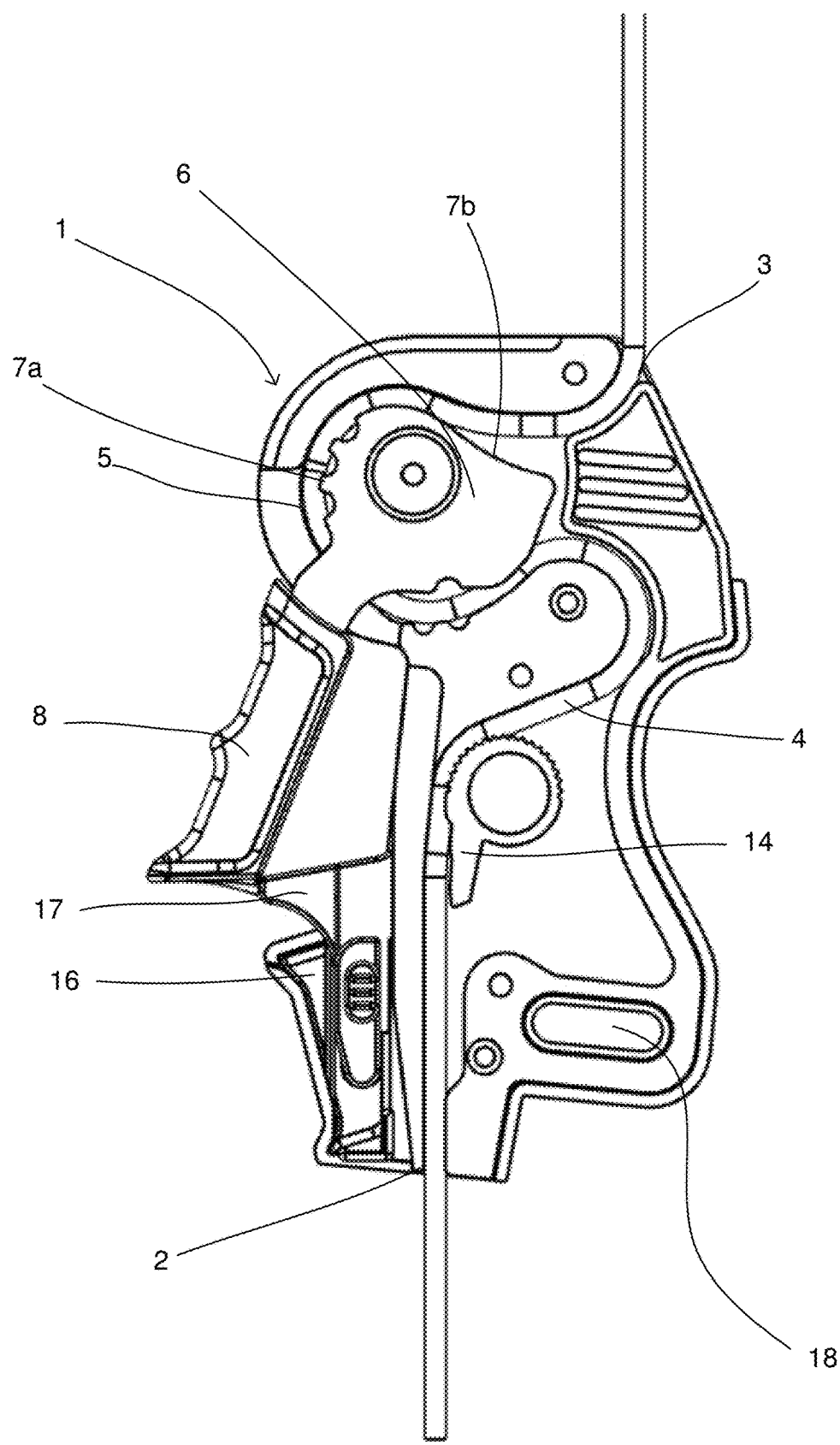
FIG. 2 shows corresponding to FIG. 1, wherein the element is in a limited free position.
Figure 4:
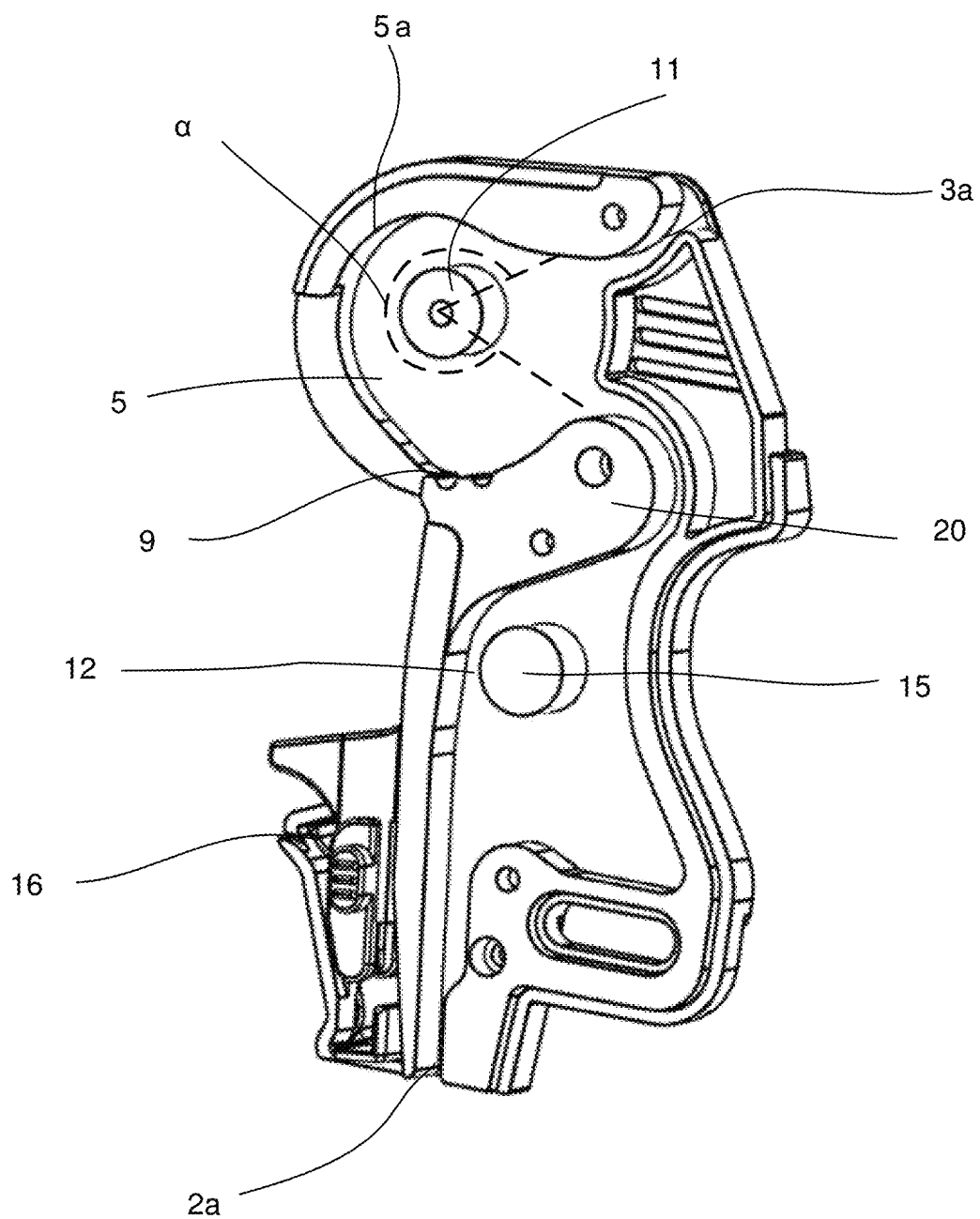

A preferred embodiment of a descent control device according to the invention is shown in the figures. The device comprises a housing 1, a rope entrance 2 and a rope exit 3, wherein the rope exit 3 and rope entrance 2 are located at opposing sides of the housing 1, leaving the rope direction out of the housing to be parallel to the rope direction into the housing. The housing is provided with narrow channels 2a, 3a for accommodating the rope both at the entrance 2 and exit 3, in order to ensure that the rope is straighten out when inside the device. FIGS. 1 and 2 show a rope 4 accommodated in the channels and running through the device, FIG. 4 shows the housing without the rope.

The housing is further provided with a channel 5 having at least one curvature of at least 270 degrees. In FIG. 4 the angle α of the curvature is shown, having 0 degrees at the beginning of the curvature and about 270-300 degrees at the end of the curvature. When the device is used for lowering, the rope 4 will enter the beginning of the curvature and leave the at the end of the curvature, and vice versa when the rope is drawn through the device for adjustment or preparation for a new use.

The width of the channel 5 in the curvature 5a is limited by a rotatable element 6 arranged in the centre of the curvature 5a. The rotatable element 6 has an outer peripheral edge 7, which includes a first portion 7a closely corresponding the shape of the curvature 5a, and a second portion (referred as the remaining peripheral edge) 7b outside the curvature having a reduced curve, shown as a flat part in the Figures. This part 7b may have another shape deviating from the shape of the curvature 5a, and being reduced compared to the shape of the curvature 5a. The element 6 is supported non-concentric, and thus the rotation axis is not in the centre of the curvature 5a and the position of the element will effect the width of the channel 5.

When the element 6 is rotated to a position wherein the part 7b having a reduced curve faces the curvature, the channel 5 is sufficiently wide to allow the rope to pass through the device with only minimal friction. This position is referred to as a free position. However, when the element 6 is rotated clockwise in the Figures, to a position whereby the shape of the element corresponds to the shape of the curvature, the channel 5 will be too narrow along substantial parts or the whole of the channel to let the rope 4 pass, and thereby the lowering will stop. This position is referred to as the stop position, and the element is shown in stop position in FIG. 1. As described above, the stop position will depend on the forces acting on the rope, that is the weight of the person or parcel being lowered.

As the channel 5 will be narrowed along substantial parts or the whole length, the forces acting on the rope 4 will be distributed along the rope, and the risk for damages and breaks are substantially reduced compared to prior art where only parts of the channel were narrowed upon rotation of the element.

The element 6 arranged inside the curvature is provided with an arm 8 protruding out of the housing. By moving the arm 8, the element 6 will rotate, and thus the width of the channel 5 and thereby the rate of the rope 4 through the device, may be adjusted by adjusting the arm. When the arm 8 is aligned with the housing 1, the element 6 will be in free position and the rope 4 may pass through the device. When the arm 8 is protruding out from the housing, preferably from the curvature, the element 6 is in stop position. This is an advantage as the user may hold the device including the arm 8, by one hand and clamp the arm 8 close to the housing 1, which will hold the element 6 in the free position letting the rope 4 pass through the element with only minimum friction. If the user releases the arm 8, or removes his/her hand, the element 6 will rotate towards stop position and the arm 8 will be swung out form the housing, and the lowering will stop, as described above. By returning the arm 8 toward the free position along the housing, the lowering will start again.

In FIG. 2 the element 5 is shown in a limited free position, allowing a rope 4 to pass through the channel 5. When the rope 4 is moving through the device, it will engage the element 6 in such a way that if the arm 8 is not held in position by the user, the friction between the element 6 and the rope 4 will create sufficient force to rotate the element 6 towards a stop position. In FIG. 1 the element shown in FIG. 2, is rotated to the stop position for maximum forces acting on the rope. The rope 4 is clamped towards the opposite channel wall of the housing, and not able to pass through the controller shown in FIG. 1. The harder the rope 4 is pulled, the harder the element 6 will be forced to rotate, the more the element 6 rotates clockwise, the narrower the width of the channel 5 becomes, and the harder the rope 4 will be clamped. This will ensure that the lowering stops if the user is not active, loses the grip of the device, or becomes unconscious.

The shown housing is further provided with limitation means to limit the rotation of the element 6, and thus set the maximum rate of the rope less than the rate of the rope when the element is in the free position. In the shown embodiment, the limitation means are arranged on the outside of the housing, and comprises a protruding part 16 of the housing, wherein a spring loaded stopper 17 is fastened. The stopper 17 protrudes along the side of the housing from the protruding part 16 towards the arm 8. As described above, when the arm 8 is along the side of the housing, the element 6 is rotated to its free position and the rope 4 is running through the housing. When the stopper 17 is in its protruded position, the arm 8 will abut the stopper as shown in FIG. 2, and the element 6 may not be rotated totally into its free position. In this way the stopper 17 prevents maximum rate of the rope by adjusting the minimum distance between the arm and the housing.

The stopper 17 is preferably spring loaded, and may be pulled back towards the protruding part 16, into a retract position, if the user wants to go beyond recommended rate. The length of the stopper 17 may be adjusted to regulate the maximum rate through the device, as the rotation of the arm 8 will be more prevented by a longer stopper as the stopper protrudes along the side of the housing, towards the arm. This may also be achieved by retracting the stopper partly to a desired length. This may, of course also be regulated in other ways, for instance by using a thicker rope 4.

Figure 3:
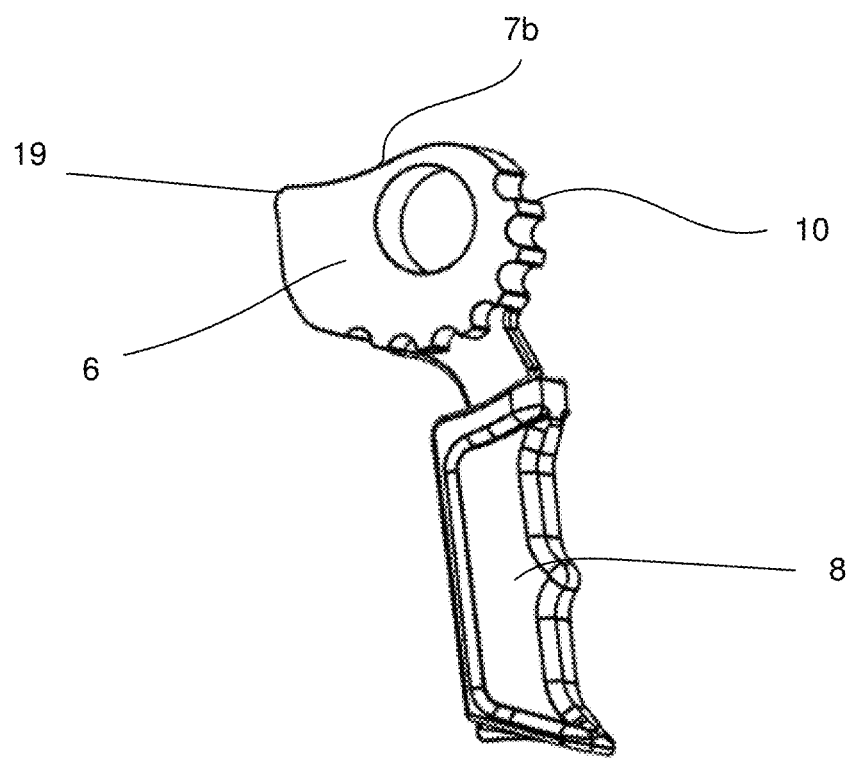
FIG. 3 shows details of a non-concentric element with an arm, and FIG. 4. shows the housing of the device in FIGS. 1 and 2 in perspective.

FIG. 3 shows details of the element 6 with the arm 8, wherein the element is flipped from the position shown in FIG. 1 and FIG. 2, whereby the face turning up in FIG. 3 is facing down in FIGS. 1 and 2. The peripheral edge of the element is shaped corresponding to the curvature, and provided with protrusions and/or recesses 10. These protrusions and/or recesses will engage the rope and rotate the element towards stop position, and finally stop the movement of the rope through the channel once the element reaches stop position. The remaining part of the peripheral edge 7, is flat in the shown embodiment. The transition between the remaining peripheral edge and the peripheral edge being curved as the curvature, in the rotating-direction towards stop position (shown to the left in FIG. 3), may be designed protruding as a nose 19, whereby the nose 19 will enter the channel in the beginning of the curvature 5 when the element is in stop position as shown in FIG. 1.

FIG. 4 shows details of the housing, and in the shown embodiment, the side of the housing, limiting the outer radius of the curvature and facing the element in the curvature, is also provided with recesses and/or protrusions to further increase the friction between the rope and the housing. In the shown embodiment the side of the housing facing the curvature is provided with two recesses 9, arranged about 45 degrees from the beginning of the curvature, that is the angle α is about 45 degrees in FIG. 4.

When the device is used, the element 6 will turn towards the stop position (clockwise in FIGS. 1 and 2) and prevent the rope 4 from passing through the device, and the lowering will stop. When the user wants to start lowering again, she/he presses the arm 8 towards the housing until the element 6 allows the rope 4 to pass through the channel 5. As long as the user assures that the manipulation arm 8 is held away from the stop position, the lowering will continue.

In a preferred embodiment, the device is provided with another separate system for reducing the rate of the rope through the device, inside the housing. The second system comprises a member 13 rotatably arranged close to the wall of the housing, thereby creating a second channel 12 for the rope between the member 13 and the housing. The member 13 is preferably asymmetrical, and thus friction acting on the rope depends on the rotation degree of the member. The same effect may be achieved by arranging the member to rotate non-concentrically.

In the shown embodiment, the member 13 of the second system is designed as a cylinder having an outer surface with protrusions and/or recesses, the cylinder is arranged to rotate non-concentrically. Further, the member 13 is provided with an arm 14 rotating clockwise towards the wall of the housing when the member is in a brake position. When the member 13 is in a free position the arm 14 is protruding away from the wall of the housing, and the rope will pass between the cylinder wall and the housing wall. This is shown in FIG. 1. When the member 13 is in brake position, the arm 14 is aligned with the housing wall prolonging the channel 12 for the rope to pass through, and as the member 13 is trying to rotate even further, the arm 14 will exert force on the rope. The member 13 is shown in brake position in FIG. 2.

When the rope is running through the housing during lowering, that is the rope is running in through the inlet 2 and out through the outlet 3, the rope will interact with the member 13, and rotate the member 13 from free to brake position. The second system will thus limit the maximum rate through the brake regardless of the curvature and element 6 described above. When the rope is running through the housing in opposite direction, such as during adjustments and resetting for a new use, the rope will interact with the member 13 and rotate it counterclockwise from brake to free position, and thus the adjustment or resetting will be easier.

In the shown embodiment, the housing is further provided with a solid protruding part 20 between the second system and the curvature. The rope 4 must pass through the second system and around the protruding part 20 before entering the curvature. In the shown embodiment, one side of the solid part constitutes a part of the channel 5 in the curvature, and the other side of the part constitutes a part of the channel 12 between the member 13 of the second system and the housing.

As said above, the element 6 is arranged rotatable in the housing 1. This may be performed in many ways which will be obvious to a skilled person. In the shown embodiment, a round axle protrusion 11 on the housing 1 fits inside a round axle hole in the centre of the element 6, and the element may rotate around the axle protrusion 11. Rotating the arm 8 will rotate the element 6 around the axel protrusion 11. In the same way, the member 13 is arranged rotatable in the housing 1. This may be performed in many ways which will be obvious to a skilled person, but in the shown embodiment, a round axle protrusion 15 on the housing 1 fits inside a round axle hole in the centre of the member 13, and the member may rotate around the axle protrusion 15 until the arm 14 of the member bears against the rope 4.

The device is designed for a given rope 4, as the width of the channel 5 and 12 must be adjusted to the thickness of the rope, in order to achieve the desired function. The softness of the rope, meaning the reduction of the thickness upon radial pressure will also be important during design of the device. The thickness and height of the protrusions and recesses 9, 10 of the element and housing must also be chosen according to the rope. The relationship will be obvious to a person skilled in the art.

In the shown embodiment of the device, the housing 1 is provided with a slot 18 for attaching a strap to carry the user. The strap should run through the slot in conventional ways to attach a strap. In an alternative not shown embodiment, the housing is provided with a corresponding hole for attaching a carabine hook to be attached to the strap carrying the user.

The friction between the rope and the housing in the second system, depends on the material, shape of the member, distance between the member and the housing, surface smoothness of the rope, surface smoothness of the member etc. During the manufacture of the descent control device, parameters of the rope and rope channel are selected to provide the correct minimum and maximum rappel rate.

The example above is given to illustrate the invention and should not be used to interpret the following claims limiting. The scope of the invention is not limited by the example give above, but the following claims. Modifications and amendments of the invention, being obvious to a person skilled of the art, should also be included in the scope of the invention.

The invention claimed is:

1. A descent control device comprising a housing, wherein the housing comprises
    a rope entrance and a rope exit for a rope,
    a channel between the rope entrance and the rope exit, the channel having at least one curvature of at least 270 degrees, for accommodating the rope internally in the housing,
    an element arranged in the centre of the curvature, forming the inner radius of the channel, the element is non-concentrically rotatable between a free position and a stop position, the element is provided with an arm protruding out through the housing for controlling the rotating between free and stop position,
        Wherein peripheral edge of the element comprises a first portion being curved closely corresponding to the curvature of the channel in the housing, and a second portion as a remaining peripheral edge of the element being less curved, wherein the remaining peripheral edge faces the curvature when the element is in a free position, and the remaining peripheral edge faces out of the curvature when the element is in a stop position, whereby the channel in the curvature is more narrow along its whole length when the element is in stop position than in free position,
    wherein the housing further comprises limitation means arranged on the outside of the housing, limiting the minimum distance between an arm and the housing.

2. The device according to claim 1, wherein the first portion of the peripheral edge of the element curved corresponding to the curvature of the channel has protrusions and/or recesses.

3. The device according to claim 2, wherein the protrusions/recesses are perpendicular to the channel.

4. The device according to claim 1, wherein the remaining peripheral edge of the element is flat.

5. The device according to claim 1, wherein the remaining peripheral edge of the element faces a curvature of the housing when the element is in free position, and at least parts of the remaining peripheral edge of the element is rotated out of the curvature when the element is in stop position.

6. The device according to claim 1, wherein the housing has protrusions and/or recesses in a side constituting an outer radius of the curvature.

7. The device according to claim 1, wherein the housing further comprises a member arranged non-concentrically rotatably close to the wall of the housing, between the inlet and outlet of the rope.

8. The device according to claim 1, wherein the housing further comprises an asymmetric member arranged rotatably close to the wall of the housing, between the inlet and outlet of the rope.

9. The device according to claim 1, wherein the housing has a protruding part on the outside, and in that in the limitation means comprises a spring loaded stopper, projecting along the side of the housing from the protruding part towards the arm protruding out of the housing.

10. The device according to claim 1, wherein the peripheral edge of the element is engaging the rope in the channel when the element is in free position.

11. The device according to claim 1, wherein the inlet and the outlet are located at opposite sides of the housing.

* * * * *